United States Patent [19]

McMillin

[11] Patent Number: 5,038,976

[45] **Date of Patent: * Aug. 13, 1991**

[54] METHOD OF AND DISPENSING HEAD FOR INCREASED CARBONATION

[75] Inventor: John R. McMillin, San Clemente, Calif.

[73] Assignee: IMI Cornelius Inc., Anoka, Minn.

[ * ] Notice: The portion of the term of this patent subsequent to Jul. 10, 2007 has been disclaimed.

[21] Appl. No.: 433,310

[22] Filed: Nov. 8, 1989

Related U.S. Application Data

[63] Continuation of Ser. No. 179,331, Apr. 8, 1988, Pat. No. 4,940,165.

[51] Int. Cl.[5] .......................... B67D 5/56; F16K 19/00

[52] U.S. Cl. ................................ 222/129.1; 222/145; 222/564; 239/416.5; 137/170.3

[58] Field of Search ............... 239/590.5, 533.1, 416.5; 137/170.3, 170.4, 170.5; 138/42-44; 251/118; 222/129.1, 129.2, 129.3, 564, 145

[56] References Cited

U.S. PATENT DOCUMENTS

| | | | |
|---|---|---|---|
| 2,726,841 | 12/1955 | Crist | 138/42 |
| 3,966,091 | 6/1976 | Bencic | 222/129.1 |
| 4,509,690 | 4/1985 | Austin et al. | 222/129.1 |
| 4,549,675 | 10/1985 | Austin | 222/129.1 |
| 4,667,700 | 5/1987 | Buzzi | 239/533.1 |
| 4,760,940 | 8/1988 | Wallace et al. | 222/129.1 |

FOREIGN PATENT DOCUMENTS

| | | | |
|---|---|---|---|
| 743485 | 12/1969 | Belgium | 222/564 |

*Primary Examiner*—Andres Kashnikow
*Assistant Examiner*—Christopher G. Trainor
*Attorney, Agent, or Firm*—Sten Erik Hakanson

[57] ABSTRACT

A beverage dispensing head and a method of dispensing that provide increased carbonation in a dispensed fountain beverage; the dispensing head has a discrete carbonated water decompression chamber in-between an upstream volumetric flow control and a downstream normally closed valve; the method includes the steps of propelling carbonated water through a flow control and then decompressing the carbonated water before it reaches the normally closed valve.

16 Claims, 1 Drawing Sheet

METHOD OF AND DISPENSING HEAD FOR INCREASED CARBONATION

This application is a co-pending continuation of U.S. Pat. application Ser. No. 07/179,331 Apr. 8, 1988, now U.S. Pat. No. 4,940,165.

BACKGROUND OF THE INVENTION

1. Field of the Invention

This invention pertains to a dispensing head and a method of dispensing for providing increased carbonation in a dispensed fountain soft drink.

2. The Prior Art

F.L. AUSTIN U.S. Pat. No. 4,549,675 has a post-mix carbonated beverage dispensing head with discrete pathways for water and syrup which both lead to a mixing nozzle. This particular dispensing head is available with two types of volumetric flow rate control for the water. The first type is a fixed elastomeric washer and the second type is a movable piston in a sleeve with an adjustable biasing spring.

The highest level of carbonation that has been obtainable from this dispensing head has been 3.6 volumes of carbon dioxide. More carbonation is wanted and needed, particularly with the most popular cola beverages.

OBJECTS OF THE INVENTION

It is an object of the present invention to provide an improved apparatus for and method of increasing the carbonation of a fountain dispensed beverage.

It is an object of the present invention to provide in a carbonated water dispensing head having discrete passageways and normally closed valves, the improvement for increasing carbonation of a toroidal carbonated water decompression chamber upstream of the normally closed valve.

It is an object of the present invention to provide a carbonated beverage dispensing system having a dispensing head with syrup and carbonated water passageways with inlets and normally closed valves, a volumetric flow rate control for the water, and a carbonated water decompression chamber in-between the inlet and the water valve.

It is an object of the present invention to provide a method of increasing carbonation in a dispensed beverage by firstly controlling the volumetric flow rate of carbonated water, then decompressing the carbonated water, and then feeding the decompressed water through a normally closed valve and a nozzle with a receptacle.

SUMMARY OF THE INVENTION

In a carbonated water dispensing head having a carbonated water inlet port, flow control housing, flow control piston, water feed port from the housing to a normally closed valve, and an outlet from the valve to a nozzle, the improvement of a toroidal carbonated water decompression chamber between the flow control piston and the normally closed valve.

A carbonated beverage dispensing system has a dispensing head with syrup and carbonated water inlets, a syrup passageway leading to a nozzle, a carbonated water passageway leading to the nozzle, a normally closed valve in each passageway, a volumetric flow rate control in the water passageway, and a carbonated water decompression chamber downstream of the flow control and upstream of the water valve.

A method of increasing the carbonation of fountain dispensed carbonated water having the steps of providing carbonated water at a propellant pressure volumetrically controlling the rate of water flow, decompressing the carbonated water after controlling the rate of flow, and then feeding the decompressed carbonated water to and through a normally closed valve and to a nozzle and into a receptacle.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

DESCRIPTION OF THE PREFERRED EMBODIMENT

Figure 1:
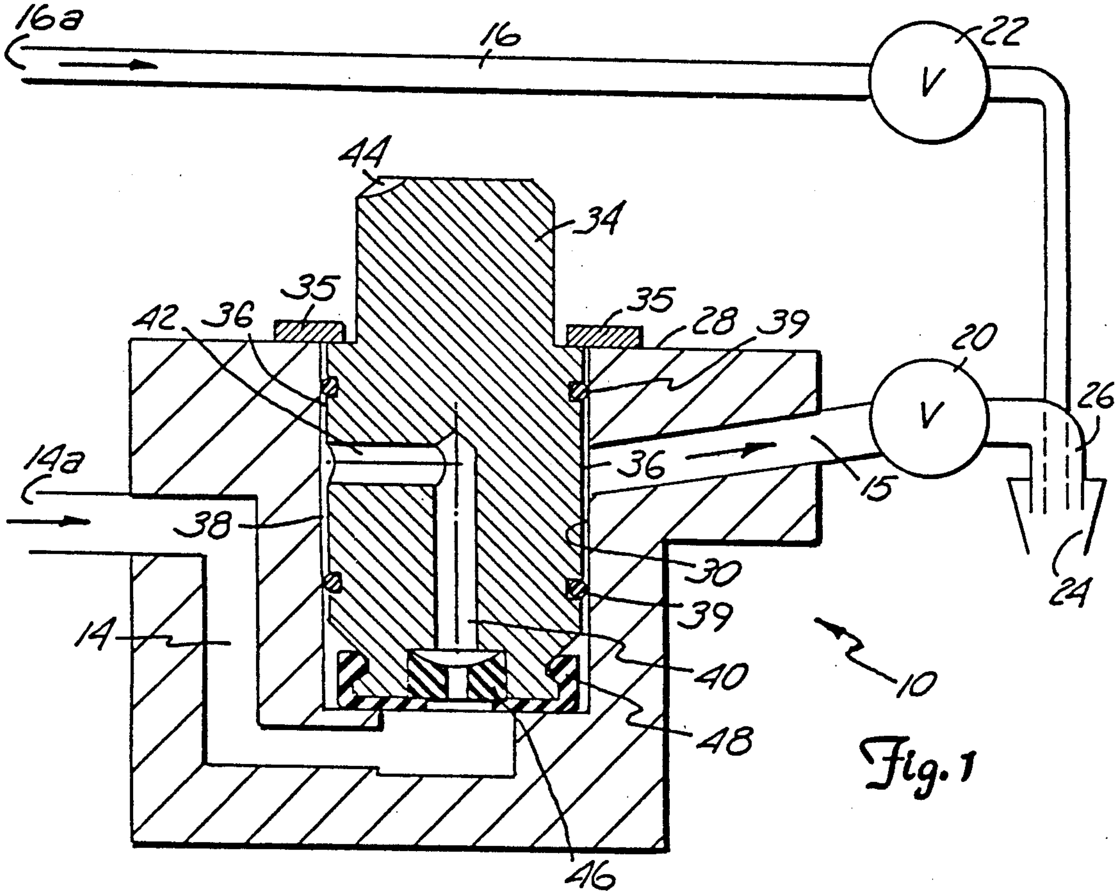
FIG. 1 is an elevational view in section of the preferred embodiment of the structure of the present invention.
Figure 2:
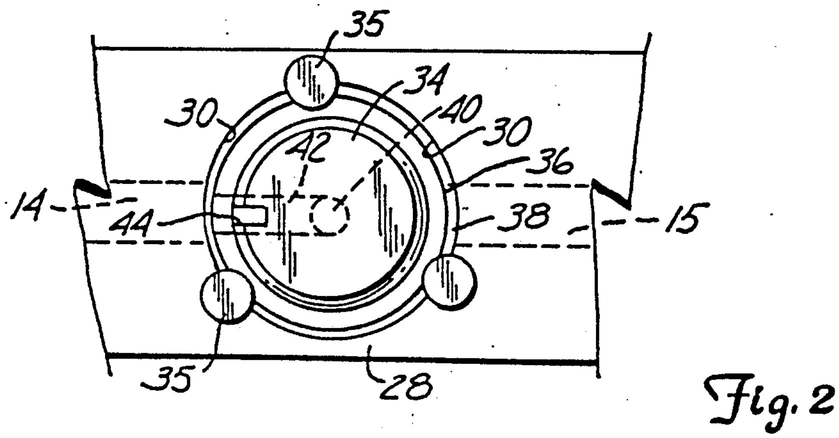
FIG. 2 is a top plan view of the structure of FIG 1.

According to the principles of the present invention a carbonated beverage dispensing head is provided as shown in FIG. 1 and which is generally indicated by the numeral 10. A preferred specific example of a complete dispensing head is the subject of F.L. AUSTIN U.S. Pat. No. 4,549,675 of Oct. 29, 1985, which is incorporated into this application by reference thereto. The basic structural components of the dispensing head 10 include a carbonated water passageway 12 which has an inlet port 14 connectible to a source of pressurized carbonated water (not shown), and a discrete syrup passageway 16 having an inlet 18 which is connectible to a discrete source of beverage syrup (not shown). Each passageway 32,16 has a discrete normally closed valve 20,22 respectively, that is operable for dispensing of beverage. The water valve 20 is usually also openable by itself, for dispensing pure carbonated water without syrup. The syrup passageway 16 ultimately leads to a dispensing nozzle 24 as does a water outlet port 26 extending from the water valve 20 to the nozzle 24. A specific dispensing nozzle 24 may be the one shown in U.S. Pat. No. 4,549,675, may be the one shown in U.S. Pat. No. 4,509,690, or may be of other common or Yet to be developed types. The nozzle 24 usually initially mixes the carbonated water and syrup together prior to the beverage falling into any appropriate receptacle, such as a cup or pitcher (not shown). In-between the water inlet port 14 and the water valve 20 is a cylindrical water flow control housing 28 having an elongate cylindrical inner surface 30 defining an inner pocket of the housing 26. The water inlet port 14 extends into the bottom of the housing 26 and into fluid communication with the inner surface 30. A water feed port 32 intersects through the cylindrical inner surface 30 and into the housing 28. The feed port 32 extends directly from the housing 28 to the normally closed water valve 20.

A fixed water flow control piston 34 is inserted, fixed, retained, in and sealed to the housing 28. The combined structure of the piston 34 and cylindrical inner surface 30 is the important structural feature of this invention and is important structure in the practice of the method of the present invention.

The piston 34 has precisely sized outer diametric surface 36 loosely slip-fitted within the cylindrical inner surface 30. A preferred specific diameter of the diametric piston surface 36 is 0.823±001 inches (20.9±0.025 mm) and a preferred specific diameter of the cylindrical inner surface 30 is 0.842±0.002 inches (21.4±0.05 mm). The annular clearance between the surfaces 30, 36 is in the range of 0.005–0.015 inches (0.125–0.375 mm) and a specific preferred clearance is 0.010±0.002 inches (0.25±0.05 mm). A toroidal carbonated water decompression chamber 38 is formed between the surfaces 30, 36 and is the annular clearance just specifically identified. A carbonated water flow port 40 extends upward from the bottom of the piston 34 and fluidly branches off into a single outlet 42 which interacts with and through the piston diametric surface 36 into the chamber 38. A preferred diameter of the flow port 40 and its outlet 42 is 0.125 inch (3.18 mm) diameter. A radial index indicator 44 is provided on the outer end of the piston 36. The indicator 44 has a fixed radial location with respect to the flow port outlet 42 for selective and predetermined radial orientation of the single outlet 42 within the housing 28. The preferred orientation of the outlet 42 is directly opposite to the feed port 32.

Opposite orientation provides a parallel flow path in the decompression chamber 38. The flow path extends from the outlet 42 around both sides of the piston 34 to the feed port 32. In the bottom of the piston 34 and at the inlet of the flow port 40 is a fixed rate elastomeric volumetric flow control washer 46. The washer 46 is held captive in the piston 34 by a snap fit retainer cap 48. The flow washer 46 is preferably non-adjustable and is always upstream of the decompression chamber 38. The decompression chamber 38 is of a precise predetermined size and is not adjustable.

The cross sectional areas of the various section of the water passageway is quite critical. The water inlet port 14 has a relatively quite large cross sectional area. The water feed port 32, and water valve 20 and water outlet port 26 have a minimum diameter of 0.160 inches (4.06 mm) and therefore a minimum cross sectional area of 0.020 square inches. The inlet port 14 is preferably larger than the feed port 32. The flow port 40 has a cross sectional area of 0.012 square inches and is smaller in cross section through the feed port 32. The decompression chamber 38 has a preferred height of 0.265 inches (6.7 mm) and has a singular cross sectional flow pathway area of 0.0065 square inches and a parallel double flow pathway area of 0.013 square inches. The cross sectional area of the decompression chamber is always smaller than the smallest cross sectional area in the feed port 32, open water valve 20, outlet port 26 or nozzle 24. The flow port 40 has a larger cross-sectional area than the decompression chamber 38 but smaller than any cross sectional area downstream of the decompression chamber 38.

In the use of the dispensing head 0 and the beverage dispensing system as described, and in the practice of the method of the present invention, carbonated water under a predetermined propellant pressure is provided at the inlet port 14. When the water valve 20 is normally closed, full propellant pressure is hydrostatically applied all the way through the water passageway 12 to the water valve 20. During dispensing the water valve 20 is solely opened to dispense only carbonated water, and both valves 20, 22 are opened to dispense a complete soft drink. Syrup flows through the syrup passageway 16 and into and out of the nozzle 24 in conventional fashion.

The carbonated water however, flows firstly through the flow washer 46 wherein the volumetric flow rate is controlled. Specific preferred predetermined carbonated water flow rates are 1.25 oz./sec. regular flow and 2.50 oz./sec. high flow. The carbonated water leaves the flow washer 46 and enters and goes through the reduced cross section flow port 40 and through the piston 34. An initial partial pressure reduction is made in the flow port 40. The carbonated water then exits out of the flow port 40 and into the highly restrictive decompression chamber 38. The flow of carbonated water through the chamber 38 is laminar & non-turbulent, and provides the greatest pressure drop experienced by the carbonated water, specifically the carbonated water is depressurized down to just above atmospheric. The carbonated water then is fed out the feed port 32, and through the valve 20 and the outlet port 26 to the nozzle 24 and then into the receptacle. The pressure drop downstream of the decompression chamber 38 is negligible.

It has been found, in actual testing, that whereas the original dispensing valve of U.S. Pat. No. 4,549,675 with the high efficiency nozzle of U.S. Pat. No. 4,509,690, would put a beverage into a cup with 3.6 volumes of carbonation. The improved dispenser head 10 and the method herein described provide a dispensed fountain beverage into a cup which consistently measures to have 4.2 volumes of carbonation with less foaming of the beverage during dispensing. The dispensed carbonated water per se without syrup likewise has a higher carbonation in the cup.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim as my invention:

1. A carbonation maintaining flow control device connectable to a pressurized source of carbonated water, comprising: a housing body, the body having an inlet port extending partially there through, the inlet port having a first end for connecting to the carbonated water source and a second end opposite therefrom and terminating within the body, and the body having an outlet port extending partially there through, the outlet port having a first end terminating within the body and a second end opposite therefrom for connecting to a dispensing valve, a flow control means retained within the housing body and in fluid communication with the inlet port second end, flow restricting chamber means within the body and the chamber means having an end surface and an interior perimeter surface and a piston retained within the chamber means, the piston having an exterior perimeter surface, the chamber means interior surface and the piston exterior surface defining an annular space there between for providing fluid communication from the flow control means to the outlet port first end and for providing gradual reducing of the pressure on the carbonated water substantially to that of atmospheric as it flows there through from the flow regulating means to the outlet port first end.

2. The carbonation device as defined in claim 1, wherein the chamber means interior surface and the piston exterior surface have a substantially circular circumference so that the annular space is substantially toroidal in shape.

3. The carbonation device as defined in claim 1, and the chamber means and the piston sized so that the annular space there between provides for greater flow restriction than the outlet flow port.

4. The carbonation device as defined in claim 1, and the piston including a flow port extending there through for providing fluid communication through the piston from the flow control means to the annular space.

5. The carbonation device as defined in claim 1, and the flow control means being a flow control washer.

6. The carbonation device as defined in claim 4, and the piston outer perimeter surface and the chamber means inner perimeter surface spaced from each other and the piston flow port sized to that the annular space and the piston flow port provide for greater flow resistance than the outlet port.

7. A carbonation maintaining flow control device connectable to a pressurized source of carbonated water, comprising: a housing body, the body defining a flow control space therein, and the control space having an end surface and an interior flow surface around an interior perimeter thereof, and the body having an inlet port extending partially there through, the port having a first end for connecting to the carbonated water source and a second end opposite therefrom and terminating at the control space end surface, and the body having an outlet port extending partially there through, the outlet port having a first end terminating at the control space flow surface and a second end for connecting to a dispensing valve, a flow control means retained within the flow space adjacent the end surface thereof for providing regulated flow rate control of the carbonated water from the inlet port second end to the control space, a piston having a first end and a second end, and held within the flow control space, and the piston having an exterior perimeter flow surface extending between the ends thereof, and the piston having a flow port extending there through from the piston first end towards the piston second end and the flow port having a first end terminating at the piston first end and in fluid communication with the flow control means, and the flow port having a second end terminating at the piston flow surface at a point thereon between the piston ends, and the piston exterior surface held adjacent the flow control space interior surface, the piston surface and the interior surface defining a restricting flow chamber and the piston flow port providing for the flow of carbonated water from the flow control means through the piston flow port and into the restricting chamber, and the restricting chamber in fluid communication with the outlet port first end for providing fluid communication of the carbonated water from the restricting chamber to the dispensing valve, and the piston surface and the interior surface spaced from each other so that the flow of carbonated water through the chamber is restricted for permitting gradual reducing of the pressure of the carbonated water as it flows from the flow control means to the outlet port, and wherein the restricting chamber limits any turbulence of the carbonated water as it flows there through to retain carbon dioxide gas in the carbonated water.

8. The carbonation device as defined in claim 7, and the piston outer perimeter surface and the control space inner perimeter surface each having a substantially circular circumference wherein the restricting chamber is toroidal in shape for providing a non-turbulent laminar flow path for the carbonated water there through.

9. The carbonation device as defined in claim 8, and the piston rotatively held within the control space and the piston rotatable about a central axis extending centrally thereof between the piston first and second ends.

10. The carbonation device as defined in claim 9, and the piston second end providing for rotational adjusting of the piston.

11. The carbonation device as defined in claim 7, and the piston outer perimeter surface and the control space inner perimeter surface spaced from each other and the flow port sized so that the restricting chamber provides for greater flow restriction than the piston flow port.

12. The carbonation device as defined in claim 11, and the piston outer perimeter surface and the control space inner perimeter surface spaced from each other and the flow port sized so that the restricting chamber and the piston flow port provide for greater flow resistance than the outlet port.

13. The carbonation device as defined in claim 7, and the flow control means being a flow control washer.

14. The carbonation device as defined in claim 8, and further including toroidal chamber sealing means around the piston perimeter surface adjacent each end of the piston and on either side of the flow port second end.

15. The carbonation device as defined in claim 14, wherein the sealing means consists of a pair of o-rings.

16. The carbonation device as defined in claim 7, and the flow port second end termination on the piston perimeter surface substantially centrally of the piston first and second ends.

* * * * *